United States Patent [19]

Kleinerman

[11] 4,061,578
[45] Dec. 6, 1977

[54] INFRARED DETECTION AND IMAGING, METHOD AND APPARATUS

[76] Inventor: Marcos Kleinerman, South Point Road, Webster, Mass. 01570

[21] Appl. No.: 673,639

[22] Filed: Apr. 5, 1976

[51] Int. Cl.² ............... H01J 31/50; G01N 21/38
[52] U.S. Cl. ....................... 250/330; 250/461 R
[58] Field of Search ............ 250/329, 330, 332, 334, 250/458, 459, 461

[56] References Cited

U.S. PATENT DOCUMENTS

| | | | |
|---|---|---|---|
| 3,639,765 | 2/1972 | Kleinerman | 250/330 |
| 3,654,463 | 4/1972 | Geusic et al. | 250/458 |
| 3,971,941 | 7/1976 | Sewell et al. | 250/330 |

Primary Examiner—Archie R. Borchelt
Attorney, Agent, or Firm—Morse, Altman, Oates & Bello

[57] ABSTRACT

A system and method for converting an infrared image to a visible image includes a luminescent film having two distinct visible spectral components that are temperature dependent, the intensity of one component decreasing with an increase in temperature and the intensity of the other component increasing with an increase in temperature. The infrared image is extracted from the ratio of the intensities of the components.

15 Claims, 1 Drawing Figure

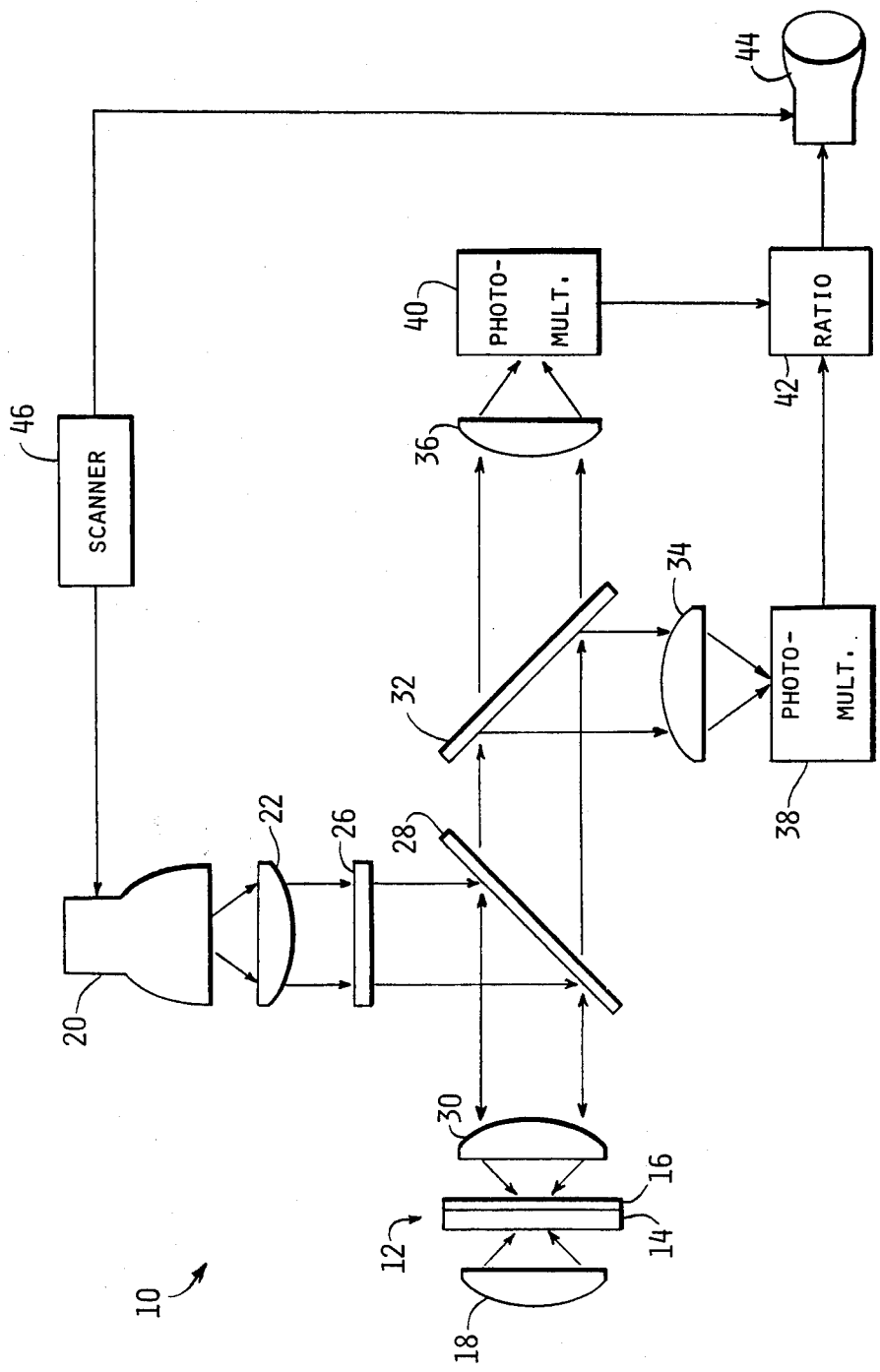
FIGURE

INFRARED DETECTION AND IMAGING, METHOD AND APPARATUS

BACKGROUND OF THE INVENTION

1. Field of Invention

The present invention relates to detection and imaging devices and more particularly, is directed towards systems and methods for infrared detection and imaging.

2. Description of the Prior Art

U.S. Pat. No. 3,639,765 relates to thermal infrared (IR) imaging detectors utilizing thermally activated luminescent processes in a thin film of a microcrystalline phophor that is excited by ultraviolet or short wavelength visible radiation. An infrared image is converted into a visible image by thermal quenching or thermal enhancement of the visible luminescent intensity of different points in the film corresponding to elements of an infrared image focused into the film.

Such systems should outperform imaging instruments based on point detectors and mechanical scanners for objects having moderate to high contrast. In many applications, however, contrasts are low. Temperature differences of 1° K in the vicinity of 300° K have a contrast ratio of only about 1 percent. In order to resolve this difference with a good signal-to-noise ratio, the film should have a response uniformity of about 0.1 percent or better which is difficult to attain. If an image tube or solid state array is used for image presentation, its photosensitive surface should have at least the same uniformity as the luminescent film. Such requirements are beyond the state of the art.

The main contributions to the non-uniformities of an infrared imaging detector described in U.S. Pat. No. 3,639,765 are:

1. variations in thermal mass between different points of the conversion film;
2. differences in luminescent excitation efficiencies between different points of the conversion film resulting from inhomogeneities in the luminescent layer;
3. variations in the intensities of the luminescent excitation radiation incident on different points of the conversion film; and
4. variations in responsivity between different points of the photosensitive surface of the image tube (or between elements of a two-dimensional array of solid-state detectors) used for the visual display of the infrared image.

SUMMARY OF THE INVENTION

It is an object of the present invention to provide a system and method for infrared detection and imaging which minimizes or eliminates the effects of the heretofore mentioned variations. The invention provides means for converting an infrared image into a visible image by means of luminescent films of low thermal mass having two types of emissive centers, such films being similar to those described in U.S. Pat. No. 3,639,765, using new methods of background subtraction and contrast enhancement.

Another object of this invention is to apply said means of image conversion to luminescent materials in which one type of emissive center produces luminescence in two distinct spectral components which are temperature dependent.

Yet another object of this invention is to provide methods for using said luminescent films as low noise point detectors for infrared radiation.

Other objects of the present invention will in part be obvious and will in part appear hereinafter.

The invention accordingly comprises the methods, apparatuses and systems, together with their steps, parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein the FIGURE is a schematic diagram of an infrared detection and imaging system embodying the invention.

DETAILED DESCRIPTION OF THE PREFERRED EMBODIMENTS

The invention now to be described, provides a system 10 for converting an infrared image into a visible image, the infrared image being extracted from the ratio of the intensities of two distinct visible or short wavelength IR spectal components of a luminescent film 12 having an infrared absorbing layer 14 and a thin, microcrystalline luminescent layer 16. Layer 14 is composed of a strongly absorbing infrared substance such as Gold Black. Layer 16 is composed of luminescent material having either (a) two types of emissive centers A* and B* (A and B in U.S. Pat. No. 3,639,765), which luminesce at two distinct visible or short wavelength IR wavelengths, or (b) one type of emissive center which luminesces at two distinct visible or short wavelength IR wavelengths. As used herein, the term short wavelength infrared refers to the region of the electromagnetic spectrum including wavelengths from about 700 nanometers to about 1.5 micrometers. The infrared region of application of the present invention includes all infrared wavelengths and, particularly, the region from 2 micrometers to 20 micrometers. In both types of luminescent material, the relative luminescence intensities of the two wavelength components are strongly dependent on temperature, with one of the components (B) increasing in intensity with an increase in temperature and the other component (A) decreasing in intensity with an increase in temperature. In one embodiment, luminescent layer 16 is a terbium ($Tb^{3+}$) chelate doped with a small amount of the europium ($Eu^{3+}$) chelate of the same ligand, the terbium chelate producing the spectral component A of the luminescence and the europium chelate producing the spectral component B. In another embodiment, the luminescent material is terbium tris [1,3bis(p-methoxyphenyl)1,3propanedione] piperidine, the B component being the $^5D_4 \rightarrow {}^7F_5$ transition. The transition becomes more intense with an increase in temperature, the temperature range for this change being from liquid helium temperature to about 10° K. The relative intensity of the A component, the $^5D_4 \rightarrow {}^7F_6$ transition, decreases in the same range.

The behavior of the film containing two kinds of emissive centers has been described in the above-mentioned patent and in a paper by M. Kleinerman (Applied Optics, 10 0.825 [1971]). Briefly stated, the thermal effect of infrared radiation decreases the luminescent intensity of the A centers and increases that of the B centers. The physical properties of an infrared conversion screen containing one type of emissive center is now described. Consider a luminescent molecule or ion whose emissive excited state decays radiately to two different energy levels. In the absence of temperature-dependent quenching processes, the sum of the luminescent intensities of the two components (A and B) is constant in units of photons per second over the temperature interval of interest. Now, if the oscillator strength of one of the components, for example component B, is thermally enhanced while that of the other is not, the incident IR produces a decrease in component A and an increase in component B, which is a similar phenomenon to the one that occurs in the film containing two kinds of emissive centers. This phenomena occurs mainly at cryogenic temperatures.

In both cases, one of the spectral components, A, decreases in intensity while the other spectral component, B, increases. In the above-mentioned patent and in the paper by Kleinerman, it was stated that the infrared image could be obtained either by the decrease in the intensity of one of the components or by an increase in that of the other. In this invention, however, the IR image is extracted from the ratio of the intensities of the two components. This ratio is a unique function of temperature and is not affected by variations in the intensity of the luminescent excitation radiation or by absorption inhomogeneities in the luminescent film. The IR image can be reconstructed using point detectors. Thus, image quality is not degraded by inhomogeneities in the detector target. Since the temperature coefficient of the ratio is greater than that of the individual components, the overall sensitivity of the system is increased.

By way of example to illustrate the invention, the luminescent IR sensitive film is kept at a temperature $T_O$ at which the luminescent intensities from both spectral components are $A_O$ and $B_O$ and are approximately equal. Both components occur at sufficiently different wavelengths so that each can be measured by a separate photodetector and filter combination without contamination from the other. Under these conditions the relative sensitivities of the detectors are adjusted so that both electrical signals are identical.

Now the IR image is focused on the film, causing the temperature of each image element to rise according to the amount of IR radiation falling on it during its thermal relaxation time $t_r$. If the new temperature is T, then the following relationship holds:

$$\frac{A_O B_T}{B_O A_T} = \exp\left[\frac{E}{K}\left(\frac{1}{T_O} - \frac{1}{T}\right)\right] \quad (1)$$

where $A_T$ and $B_T$ are the luminescent intensities of components A and B at temperature T;

E is the activation energy needed to increase the luminescent intensity of component B at the expense of component A; and k is the Boltzmann constant.

In this case, the measured ratio $A_O/B_O = 1$ (because of the detector sensitivity adjustment). The IR image is then reconstructed by the apparatus shown in the accompanying figure. An infrared lens 18 focuses the infrared image on luminescent film 12. The IR image is scanned by an ultra-violet spot produced by a flying spot scanner 20. Light from the spot is collected by a lens 22, filtered by an ultra-violet transmitting, visible absorbing filter 26 and focused into film 12 by a dichroic mirror 28 and condensing lens 30. The luminescence from film 12 is collected by condenser 30 and sent through mirror 28 to a dichroic mirror 32, where it is split into the two components from the A and the B centers, and focused by lenses 34 and 36 into photomultipliers 38 and 40, respectively. The signals generated by photomultipliers 38, 40 are ratioed by ratio measuring device 42. The ratio signal generated by device 42 is fed, after background subtraction, into a cathode ray tube 44 for presentation. Cathode ray tube 44 is scanned by scanner 46 synchronously with flying spot scanner 20. In the illustrated embodiment, by way of example, ratio measuring device 42 is an analog ratio operator. Such an analog ratio operator is available as an integrated circuit chip. In another embodiment, ratio measuring device 42 is a series opposition arrangement of the electrical signals from A and B. This is valid because $$\frac{B_T}{A_T} = \frac{1+x}{1-x} \quad (2)$$

where $x$ is the value of the change in the signals from A and from B, and for small values of $x$ $$\frac{1+x}{1-x} \approx 1 + 2x \quad (3)$$

The opposition arrangement of the signals from A and from B essentially gives the value of $2x$. This is corrected by dividing it by the value of $A_T$.

By means of this method, the inhomogeneities in the luminescent layer (except those that affect the thermal mass of the conversion film) and those in the excitation light source are cancelled out. In addition, the use of photomultipliers eliminates detector inhomogeneities which would otherwise be present if image tubes are used.

One disadvantage of this method is that it requires very fast luminescent materials for scenes including moving objects: if the scene has $10^4$ image elements and is scanned at 30 frames per second, then the luminescence of each image element should have a duration of not more than about 3 microseconds. This would eliminate terbium and europium chelates which have luminescence decay times near 1 millisecond, but have otherwise very good characteristics for this type of application, especially low thermal mass and large temperature coefficients for the ratio ($B_T/A_T$), which can approach 20 percent per degree at 77° K and exceed one thousand percent at liquid helium temperatures.

THE USE OF IMAGE SENSORS

The main advantage of image sensors compared to point detectors is that they permit real time displays of moving objects without requiring very fast luminescent materials. The luminescent time constant need not be much shorter than a video frame time.

The main disadvantage is the response inhomogeneity of the sensor target. Since the parameter to be measured is the ratio $B_T/A_T$, standard techniques would require two target points of identical responsivity (within about 0.1 percent), each in a different image sensor, for each image element for a true value of the ratio. Such uniformity is at present beyond the state of the art.

One purpose of this invention is a method for eliminating this problem by a procedure for measuring the $B_T/A_T$ ratio for each image element on the same target point of one image sensor. This is accomplished as follows.

Component A of the luminescence is imaged (through an optical filter) on the target of the image sensor. Then the target is scanned. The electrical signals from each image element are fed sequentially into a delay device. Then the filter is substituted by one that passes component B of the luminescence. This is imaged on the same target, and the target is scanned. The undelayed B signal from each image element arrives at an analog ratio operator simultaneously with the delayed A signal from the same image element. Since both signals have been obtained at the same target point, the measured ratio is unaffected by target inhomogeneities.

The sequence just described is made to take place during a video frame time. In one embodiment, a mechanical light chopper is used for switching the filters automatically.

A similar technique can be used for correcting $B_T/A_T$ ratios obtained with two image sensors. Uniform illumination consisting of spectral component A is applied to the target of one image sensor, and the target of the second image sensor is uniformly illuminated with spectral component B, under such conditions that the total photocurrent generated at one image sensor is equal to that generated at the other. Then the targets are scanned synchronously, and the instantaneous signals for each pair of target elements are divided at a ratio operator. For perfectly matched pairs the signals should be identical and the ratios should be 1.000. Any departure from this value is a measure of the mismatch between the target points. The measured ratios for each pair of target elements are stored in a memory as correction factors. Now an infrared image is focused on the conversion film, and both spectral components are imaged into their corresponding image sensors. The ratio of the signals for each pair of image elements is then divided by the corresponding correction factors previously stored as described above.

A similar procedure can be used for correcting the effect of thermal mass inhomogeneities in the conversion film.

Point Detectors

The same crystalline materials described above can be used as point detectors for infrared radiation. The IR intensity is also extracted from the $B_T/A_T$ ratio, and a high signal-to-noise ratio can be achieved by A.C. modulation of the IR radiation.

In practice, an arrangement very similar to the one described in the accompanying FIGURE can be used with the difference that the IR radiation has been chopped and the conversion film has been made as small as the focused IR spot. The photodetectors can be photomultipliers or inexpensive silicon photodiodes, and the photosignals are amplified by an amplifier tuned to the IR chopping frequency. The AC signals are added up in a series opposition arrangement already described.

Since certain changes may be made in the foregoing disclosure without departing from the scope of the invention herein involved, it is intended that all matter contained in the above description and depicted in the accompanying drawings be construed in an illustrative and not in a limiting sense.

I claim:

1. A method for converting an infrared image comprising the steps of focusing an infrared image on an infrared absorbing film having applied thereon a thin layer of a luminescent material, the luminescence of said material being produced upon irradiation with ultraviolet or visible radiation, said luminescence having two distinct visible or short wavelength IR spectral components identified as A and B, the ratio of the intensities being determined by the temperature of the luminescent material, the intensity of said component A decreasing with an increase in temperature and the intensity of said component B increasing with an increase in temperature; measuring the ratio of the intensities of said A and B components for each resolvable element of the infrared image focused on said film; and processing and displaying an image corresponding to the ratio distribution of the luminescent intensities.

2. The method as claimed in claim 1 wherein the spectral components A and B are produced respectively by two types of luminescent centers identified as A* and B*, the ratio of the intensities of said spectral components being determined by the rate K of energy transfer from the A* centers to the B* centers, said rate of energy transfer being increased by the heating effect of the incident infrared radiation.

3. The method as recited in claim 1 wherein the infrared image is reconstructed by scanning the luminescent layer with an ultraviolet or short wavelength visible flying spot; measuring the intensities of spectral components A and B simultaneously with two point photo detectors, one for each spectral component, at each resolvable point on said luminescent layer; obtaining the ratio of the intensities of said spectral components; and feeding the resulting electrical signal to a video processing and display device scanned in synchronization with said flying spot.

4. The method as recited in claim 1 wherein the infrared image is reconstructed by uniformly irradiating the luminescent layer with ultraviolet or short wavelength visible radiation; focusing the resulting luminescence components A and B alternately into the photosensitive target of a signal-generating image sensor so that the A and the B components of each image element are focused on the same spot of said photosensitive target; delaying the electrical signals produced by the A spectral component of each image element for a time exactly equal to the interval between the scans of the A and the B components focused on said target so that the electrical signals from both said components of each image element arrive simultaneously at a ratio-measuring device; and feeding the resulting electrical signal to a video processing and display device.

5. The method as recited in claim 1 wherein the luminescent material is a microcrystalline $Tb^{3+}$ chelate doped with a small amount of the $Eu^{3+}$ chelate of the same ligand, said $Tb^{3+}$ chelate producing said spectral component A of the luminescence, and said $Eu^{3+}$ chelate producing said spectral component B.

6. The method as recited in claim 1 wherein the spectral components A and B are produced by a material having only one emissive species, said component B arising from an electronic transition which is intensified by an increase in temperature, the sum of the luminescence yields of both components remaining invariant.

7. The method as recited in claim 6 wherein the luminescent material is terbium tris [1,3bis(p-methoxyphenyl)1,3propanedione] piperidine, the B component of which is the $^5D_4 \rightarrow {}^7F_5$ transition, said transition becoming more intense with an increase in temperature, the temperature range for this change being from liquid helium temperatures up to about 10° K.

8. A method for detecting infrared radiation comprising the steps of focusing the infrared radiation on an infrared absorbing film having applied thereon a thin layer of a luminescent material, the luminesence of said material being produced upon irradiation with ultraviolet or short wavelength visible radiation, said luminescence including two distinct visible or short wavelength IR spectral components identified as A and B, the ratio of the intensities of said component being determined by the temperature of the luminescent material, the intensity of component A decreasing with an increase in temperature and the intensity of component B increasing in a correlated manner; measuring the change of the luminescence from said components A and B produced by the heating effect of the infrared radiation; and combining said luminescence signal from said spectral components A and B.

9. The method as recited in claim 8 wherein the spectral components A and B are produced respectively by two types of luminescent centers identified as A* and B*, the ratio of the intensities of said spectral components being determined by the rate of energy transfer from the A* centers to the B* centers, said rate of energy transfer being increased by the heating effect of the infrared radiation.

10. The method as recited in claim 9 wherein the luminescent material is a microcrystalline $Tb^{3+}$ chelate doped with a small amount of the $Eu^{3+}$ chelate of the same liqand, said $Tb^{3+}$ chelate producing said spectral component A of the luminescence, and said $Eu^{3+}$ chelate producing said spectral component B.

11. The method as recited in claim 8 wherein the spectral components A and B are produced by a material having only one emissive species, said component B arising from an electronic transition which is intensified by an increase in temperature, the sum of the luminescence yields of both components remaining invariant.

12. The method as recited in claim 11 wherein the luminescent material is terbium tris [1,3(p-methoxyphenyl)1,3propanedione] piperidine.

13. An infrared image converter comprising an infrared absorbing film having applied thereon a thin layer of a luminescent material, the luminescence of said material being produced upon irradiation with ultraviolet or visible radiation, said luminescence having two distinct visible or short wavelength IR spectral components identified as A and B, the ratio of the intensities of said components being determined by the temperature of the luminescent material, the intensity of component A decreasing with an increase in temperature and the intensity of component B increasing with an increase in temperature, means for generating the luminescence of said material, measuring means operatively connected to said generating means for measuring the ratio of the intensities of said components A and B for each resolvable element of the infrared image focused on said film, and processing and displaying means for presenting a visible image corresponding to said ratio distribution.

14. A method for converting an infrared image to a visible image comprising the steps of focusing an infrared image on an infrared absorbing film having applied thereon a thin layer of a luminescent material, the luminescence of said material being produced upon irradiation with ultraviolet or visible radiation, said luminescence having two distinct visible or short wavelength IR spectral components identified as A and B, the ratio of the intensities being determined by the temperature of the luminescent material, the intensity of said component A decreasing with an increase in temperature and the intensity of said component B increasing with an increase in temperature; measuring the ratio of the intensities of said A and B components for each resolvable element of the infrared image focused on said film; and processing and displaying a visible image derived from the ratio distribution of the luminescent intensities.

15. A device for converting an infrared image to a visible image comprising an infrared absorbing film having applied thereon a thin layer of a luminescent material, the luminescence of said material being produced upon irradiation with ultraviolet or visible radiation, said luminescence having two distinct visible or short wavelength IR spectral components identified as A and B, the ratio of the intensities of said components being determined by the temperature of the luminescent material, the intensity of component A decreasing with an increase in temperature and the intensity of component B increasing with an increase in temperature, means for generating the luminescence of said material, measuring means operatively connected to said generating means for measuring the ratio of the intensities of said components A and B for each resolvable element of the infrared focused on said film, and processing and displaying means for presenting a visible image derived from said ratio distribution.

* * * * *